(12) United States Patent
Gottschalk et al.

(10) Patent No.: US 12,725,809 B2
(45) Date of Patent: Sep. 1, 2026

(54) METHOD FOR PRODUCING A MEMBRANE-ELECTRODE ASSEMBLY

(71) Applicant: Robert Bosch GmbH, Stuttgart (DE)

(72) Inventors: Andy Gottschalk, Lauter (DE); Robert Landvogt, Staffelstein (DE); Andreas Gehrold, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 569 days.

(21) Appl. No.: 18/252,084

(22) PCT Filed: Nov. 12, 2021

(86) PCT No.: PCT/EP2021/081538

§ 371 (c)(1),
(2) Date: May 8, 2023

(87) PCT Pub. No.: WO2022/106317

PCT Pub. Date: May 27, 2022

(65) Prior Publication Data

US 2023/0411645 A1 Dec. 21, 2023

(30) Foreign Application Priority Data

Nov. 18, 2020 (DE) ..................... 10 2020 214 491.5

(51) Int. Cl.
*H01M 8/0273* (2016.01)
*H01M 8/1004* (2016.01)
*H01M 8/242* (2016.01)

(52) U.S. Cl.
CPC ....... *H01M 8/0273* (2013.01); *H01M 8/1004* (2013.01); *H01M 8/242* (2013.01)

(58) Field of Classification Search
CPC .................................................. H01M 8/0273
See application file for complete search history.

(56) References Cited

U.S. PATENT DOCUMENTS

2004/0241525 A1 12/2004 Mekala et al.
2005/0095490 A1* 5/2005 Mittelstadt .......... H01M 8/1004 429/510

(Continued)

FOREIGN PATENT DOCUMENTS

CN 1701458 A 11/2005
CN 104756293 A 7/2015

OTHER PUBLICATIONS

Translation of International Search Report for Application No. PCT/EP2021/081538 dated Feb. 11, 2022 (2 pages).

*Primary Examiner* — Brian R Ohara
(74) *Attorney, Agent, or Firm* — Michael Best & Friedrich LLP

(57) ABSTRACT

A method for producing membrane-electrode assemblies (6) for a fuel cell unit (1) as a fuel cell stack (1), comprising the following steps: providing in each case one proton exchange membrane (5), providing in each case one first subgasket (53) as sealing layer (41), providing in each case one second subgasket (54) as sealing layer (41), arranging the in each case one proton exchange membrane (5) between the in each case first and in each case second subgasket (53, 54), connecting the in each case one proton exchange membrane (5) to the in each case first and/or in each case second subgasket (53, 54), such that in each case one layered inner region (38) of the in each case one proton exchange membrane (5) is enclosed by the in each case one first and second subgasket (53, 54) as sealing layers (41), wherein the proton exchange membranes (5), the first subgaskets (53), and the second subgaskets (54) are provided in that they are removed as proton exchange membrane strip (65), first subgasket strip (63), and second subgasket strip (64) from storage devices (58, 59, 60) and the arrangement of the proton exchange membranes (5) between the first and second subgaskets (53, 54) and the connection of the proton (Continued)

exchange membranes (5) to the first and/or second subgaskets (53, 54) are configured in the state of the first subgaskets (53) as first subgasket strip (63) and of the second subgasket (54) as second subgasket strip (64), such that, during the arrangement and connection, the first subgaskets (53) are arranged connected to one another on the first subgasket strip (63) and the second subgaskets (54) are arranged connected to one another on the second subgasket strip (64).

17 Claims, 10 Drawing Sheets

(56) References Cited

U.S. PATENT DOCUMENTS

2008/0142152 A1* 6/2008 Debe .................. H01M 8/2457
156/247
2010/0000679 A1 1/2010 Han et al.
2012/0321986 A1 12/2012 Mekala et al.
2014/0093807 A1 4/2014 Iverson et al.
2017/0256810 A1* 9/2017 Lee .................... H01M 8/0286

* cited by examiner 27
10
29
26
21
15
11
25
28
18
20
22,23,24
9
16
2
8
6
7
9
16
19
17
25
27
11
10
29
26
15
11
28
9
8
6
7
2
25
16
9
27
11
10
26
15
29
28
1,4

A-A
41,52,54,57
50
57
56
42
42
43,45
41,51
5,38
43,44
42
46,48
57
52,57
56
46,47
41,51
57
49
51
56
42
46,48
43,44
43,45
42
42
52,57
46,47
6
A-A
41,52,54,57

46,48
41,54
41,53
42
52,57
50
50
56
41,53
6
41,54
43,45
43,45
7
8
51
55
55
38
49
5
30
30
43,45
43,45
41,54
56
41,53
52,57
42
41,54
41,53
46,48

6
5
53
54
80
79
79
77, 78
77, 78
54,64
53,63
5
54,64
53,63
75,76
75,76
54,64
54,64
5
53,63
70,71
74
5
72,73
5,65
53,63
59
60
68,69
58

6
81
54,64
53,63
5
77, 78
77, 78
54,64
53,63
5
54,64
53,63
75,76
75,76
54,64
54,64
5
70,71
53,63
74
5
72,73
59
60
5,65
53,63
68,69
58

6
81
82,83
77, 78
77, 78
5
54,64
53,63
75,76
75,76
54,64
54,64
5
70,71
53,63
74
5
72,73
53,63
5,65
59
60
68,69
58

54
6
5
9
54,64
79
53
80
9
53,63
9
5 9
86,87
86,87
84,85
84,85
9,67
66,9
62
61
54,64
53,63
88
88
77,78
77,78
75,76
75,76
54,64
70,71
74
53,63
5
72,73
5,65
59
60
68,69
58

METHOD FOR PRODUCING A MEMBRANE-ELECTRODE ASSEMBLY

BACKGROUND

The present invention relates to a method for producing a membrane-electrode assembly, a fuel cell unit, and a method for producing a fuel cell unit.

Fuel cell units as galvanic cells convert continuously supplied fuel and oxidizer into electrical energy and water by means of redox reactions on an anode and cathode. Fuel cells are used in a wide variety of stationary and mobile applications, for example, in homes without connection to a power grid or in motor vehicles, rail transport, aviation, space travel, and marine applications. In fuel cell units, a plurality of fuel cells are stacked on top of one another in a stack.

In the manufacture of a fuel cell unit from layered components, in particular membrane-electrode assemblies, gas diffusion layers, and bipolar plates, these are stacked into fuel cells, and the fuel cells are stacked into the fuel cell unit. The membrane-electrode assemblies comprise proton exchange membranes having a layered anode and a layered cathode, and preferably a respective layered catalyst layer on the anode and cathode.

A layered inner region of the membrane-electrode assembly is formed from the proton exchange membrane with the anode and cathode and preferably catalyst layers, and these are each enclosed by the in each case first and a second subgasket as a sealing layer. In the first and second subgaskets, an opening for the proton exchange membrane with the anode and cathode, and furthermore fluid openings for the process fluids fuel, oxidizer, and coolant as a cooling fluid, are formed. For the manufacture of a membrane-electrode assembly, a first subgasket is cut off from raw material, a second subgasket is cut off from raw material, and a CCM (coated catalyst membrane) made of proton exchange membrane, anode, and cathode as well as catalyst layers is cut off from raw material. In the first and second subgaskets, the fluid openings and the openings are to be worked in individually. These cut-off layers must be stacked exactly over one another, and this must also be measured, subsequently the three layers are laminated at temperatures between 70° C. and 150° C. and at a pressing force between 10 kN and 500 kN between presses. These presses must be time-consumingly opened, emptied, and refilled for each operation before the pressing can start and subsequently, after opening, the membrane-electrode assembly can be removed, i.e. a discontinuous manufacture of the membrane-electrode assemblies takes place. The membrane-electrode assemblies can only be stacked in a stack after cooling for storage and/or transport. Due to the small layer thickness, it is difficult to remove individual membrane-electrode assemblies from this stack, with the high risk of damaging them.

SUMMARY

A method according to the invention for producing membrane-electrode assemblies for a fuel cell unit as a fuel cell stack, comprising the following steps: providing in each case one proton exchange membrane, providing in each case one first subgasket as sealing layer, providing in each case one second subgasket as sealing layer, arranging the in each case one proton exchange membrane between the in each case first and in each case second subgasket, connecting the in each case one proton exchange membrane to the in each case first and/or in each case second subgasket, such that in each case one layered inner region of the in each case one proton exchange membrane is enclosed by the in each case one first and second subgasket as sealing layers, wherein the proton exchange membranes, the first subgaskets, and the second subgaskets are provided in that they are removed as proton exchange membrane strip, first subgasket strip, and second subgasket strip from storage devices and the arrangement of the proton exchange membranes between the first and second subgaskets and the connection of the proton exchange membranes to the first and/or second subgaskets are configured in the state of the first subgaskets as first subgasket strip and of the second subgasket as second subgasket strip, such that, during the arrangement and connection, the first subgaskets are arranged connected to one another on the first subgasket strip and the second subgaskets are arranged connected to one another on the second subgasket strip.

In a further configuration, the first subgaskets are removed, in particular unwound, from a first storage device, in particular a first roll, as first subgasket strip, the second subgaskets are removed, in particular unwound, from a second storage device, in particular a second roll, as second subgasket strip, and the proton exchange membranes are removed, in particular unwound, from a third storage device, in particular a third roll, as proton exchange membrane strip. In storage devices, for example, the strips are wound up in rolls or stacked on top of one another in a meandering fashion in containers as storage devices.

In a supplementary configuration, the removal, in particular unwinding, of the proton exchange membranes, the first subgaskets, and the second subgaskets from the storage devices, in particular the rollers, the arrangement of the proton exchange membranes between the first and second subgaskets, and the connection of the proton exchange membranes to the second subgaskets is carried out in a continuous process.

In an additional variant, the removal, in particular unwinding, of the proton exchange membranes, the first subgaskets, and the second subgaskets from the storage devices, in particular the rollers, the arrangement of the proton exchange membranes between the first and second subgaskets, and the connection of the proton exchange membranes to the second subgaskets is carried out simultaneously.

In a further embodiment, after the removal, in particular the unwinding, of the first subgaskets from the first storage device, in particular the first roll, fluid openings for process fluids are worked into the first subgaskets as first subgasket strip, in particular six fluid openings in a fluid opening region, and, after the removal, in particular the unwinding, of the second subgasket from the second storage device, in particular the second roll, fluid openings for process fluids are worked into the second subgaskets as second subgasket strip, in particular six fluid openings in a fluid opening region. The fluid openings and/or the openings in the first and/or second subgasket strips are expediently formed in the storage device so that no further working in of the fluid openings and/or openings is necessary. The working in of the fluid openings and/or openings and/or perforations is expediently carried out with separating devices, in particular embossing rolls.

In an additional configuration, the fluid openings are worked into the first and second subgaskets as first and second subgasket strips before or after the arrangement of the proton exchange membranes between the first and second subgaskets and preferably the connection of the proton exchange membranes to the first and/or second subgaskets is carried out.

In a further variant, after the incorporation of the fluid openings into the first and second subgaskets, the first and second subgaskets are arranged as first and second subgasket strip on top of one another so as to align the respective fluid openings of the first and second subgaskets.

In an additional embodiment, after the removal, in particular the unwinding, of the first subgaskets from the first storage device, in particular the first roll, one perforation per respective opening for the proton exchange membrane is worked into the first subgaskets as first subgasket strip in a respective strip region, and after the removal, in particular the unwinding, of the second subgaskets from the second storage device, in particular the second roll, one perforation per respective opening for the proton exchange membrane is worked into the second subgaskets as second subgasket strip in a respective strip region. The perforations are expediently worked in with separating devices, in particular embossing rolls. Thus, until a portion of the first and second subgaskets within the perforations is removed, the production method can be carried in a process from process roller to process roller, because the proton exchange membranes with anodes and cathodes are protected by the first and second subgasket when deflected on the process rollers. For example, process rollers are a laminating roll and/or embossing roll and/or deflection rolls. The first subgasket strip, which is arranged at the bottom during the method, also forms a support for the strip during the method.

In a supplementary configuration, the fluid openings and the perforations for the openings are continuously worked into the first and second subgaskets as first and second subgasket strips by separating devices, in particular embossing rollers.

In a further variant, before the arrangement of the proton exchange membranes between the first and second subgaskets as first and second subgasket strip, the proton exchange membrane is cut off from the proton exchange membrane strip for a respective membrane-electrode assembly, and a respective section is cut off from the proton exchange membrane strip as the respective proton exchange membrane for the respective membrane-electrode assembly, and subsequently the arrangement of the respective proton exchange membrane as the respectively cut-off section between the first and second subgasket strip is carried out.

In a further variant, at sub-regions of the first and second subgasket strip in the longitudinal direction between the proton exchange membranes, no proton exchange membrane is arranged. Preferably, the sub-regions are formed from the fluid opening regions of the membrane-electrode assemblies.

In an additional configuration, the separated sections as the proton exchange membranes are fixed on the first or second subgasket strip, in particular in a materially locking manner with a laminating roller, before being arranged between the first and second subgaskets as first and second subgasket strip.

In a further variant, after the arrangement of the proton exchange membranes between the first and second subgaskets as first and second subgasket strip and the connection of the proton exchange membranes to the first and/or second subgaskets as first and second subgasket strip, the first and second subgasket strip are separated, so that individually separate membrane-electrode assemblies are produced. Preferably, the separating is carried out with a separating device, in particular a fourth separating device, for example a separating roller.

A fuel cell unit according to the invention as a fuel cell stack for electrochemically generating electrical energy, comprising fuel cells arranged in a stacked manner, the fuel cells comprising a respective proton exchange membrane, an anode, a cathode, a bipolar plate, and a gas diffusion layer, wherein the proton exchange membrane, the anode, and the cathode form with a first and second subgasket a membrane-electrode assembly, wherein the membrane-electrode assemblies are produced with a method described in this intellectual property application and/or the edges on the first and second subgaskets at the openings for the proton exchange membranes in sub-regions are produced with a perforation by means of punching as punched edge sub-regions and, at other sub-regions outside the perforations, are formed as torn edge sub-regions and/or no catalyst layer and/or no anode and/or no cathode is formed on the membrane-electrode assemblies at an overlap region between the first and second subgasket and the proton exchange membrane, and in particular the membrane-electrode assemblies are manufactured using the method according to the machine system in FIG. 12, wherein no cathodes and no anodes are present at the overlap region, when the cathodes and anodes are applied with a coating to the proton exchange membranes during the method and are not present on the proton exchange membrane strip in the storage device.

The method according to the invention for producing a fuel cell unit as a fuel cell stack for electrochemically generating electrical energy, with the following steps: providing components of the fuel cells, namely membrane-electrode assemblies, gas diffusion layers, and bipolar plates, wherein the membrane-electrode assemblies comprise a respective layered inner region with a proton exchange membrane, an anode, and a cathode and two respective sealing layers as first and second subgasket, and the proton exchange membrane is arranged between the anode and cathode, and the sealing layers enclosing the inner region are configured as first and second subgaskets, stacking the components of the fuel cells so that fuel cells and a fuel cell unit are formed, wherein the membrane-electrode assemblies are provided in that a method described in this intellectual property application is carried out.

In a further configuration, an adhesive coating is arranged or applied on an inner side of the first and/or second subgasket strip. By means of the adhesive coating, the first and second subgasket strips are connected to one another and the first and/or second subgasket strips are connected to the proton exchange membranes in the at least one device for joining, for example a laminating roller at a high temperature of between 70° and 150° C.

Preferably, no adhesive coating is arranged on the inner sides of the first and/or second subgasket strips in the storage device, and the adhesive coating is applied to the inner sides of the first and/or second subgasket strips with a coating device, in particular a spraying device, during the method. Thus, the adhesive coating can advantageously be applied only to the necessary regions of the inner sides of the first and/or second subgasket strips, i.e. not to inner sides within the perforations, for example.

In a further configuration, the first and/or second subgasket strip comprises the proton exchange membrane and the anode and cathode, and preferably two catalyst layers on the anode and cathode as the CCM (coated catalyst membrane).

In a further embodiment, the two catalyst layers are applied with devices for applying catalyst layers, in particular spraying devices, to the anodes and/or cathodes and/or the proton exchange membranes. This allows material for the catalyst layers to be conserved, because no catalyst layer is present between the first and/or second subgasket at the overlap region as is done in a method in which the catalyst layers are already fully formed on the proton exchange membrane strip in the storage device on one or both sides. In so doing, the proton exchange membranes are arranged and fixed at the overlap regions between the first and second subgasket strips during coating with the two catalyst layers, so that preferably the bulging of the proton exchange membranes during coating leads to substantially no wave formation of the proton exchange membrane.

Preferably, the catalyst layers applied to the first and/or second subgasket strips are removed, in particular with brushing and/or shaking and/or laser methods and/or scraping and/or compressed air, and the removed catalyst layers are preferably reused for later coatings with catalyst layers. This can be necessary, because the catalyst layers can only be applied to the proton exchange membranes within the openings without a sufficiently high production accuracy.

In a further embodiment, the two catalyst layers and the anodes and cathodes, in particular as first and second mixed layers or as separate layers, are applied to the proton exchange membranes with devices for applying catalyst layers, anodes, and cathodes, in particular spraying devices. This allows material for the catalyst layers, anodes, and cathodes to be conserved, because no catalyst layers, no anodes, and no cathodes are present between the first and/or second subgasket at the overlap region as is done in a method in which the catalyst layers, anodes, and cathodes are already fully formed on the proton exchange membrane strip in the storage device on one or both sides. The mixed layers are configured as a catalyst layer with anode or cathode.

Preferably, the catalyst layers, anodes, and cathodes applied to the first and/or second subgasket strips are removed, in particular with brushing and/or shaking and/or laser methods and/or scraping and/or compressed air, and the removed catalyst layers, anodes, and cathodes are preferably reused for later coatings with catalyst layers, anodes, and cathodes. This can be necessary, because the catalyst layers, anodes, and cathodes can only be applied to the proton exchange membranes within the openings without a sufficiently high production accuracy.

In a further variant, no catalyst layer and/or no anode and/or no cathode is arranged at overlap regions of the first and second subgasket strips with the proton exchange membrane between the first and second subgasket strips.

In a further configuration, a first and/or second drying device is used in order to dry the applied catalyst layers and/or anodes and/or cathodes.

The strip with the first and second subgasket strip and the proton exchange membranes is expediently deflected and/or treated and/or changed by process rollers.

Preferably, coatings, in particular with adhesive for an adhesive layer and/or with catalyst material for a catalyst layer and/or with anode material for an anode layer or anode, and/or with cathode material for a cathode layer or cathode, are configured by way of nozzles and/or slotted nozzles, in particular intermittently, and/or by template printing and/or by screen printing.

In a further variant, the anode and the cathode in the openings each have the same or different dimensions and/or surfaces on a respective membrane-electrode assembly.

In a further configuration, the catalyst coatings form the anodes and cathodes, or the anodes and cathodes are additional coatings in supplementation to the catalyst coatings.

In a further configuration, with at least one camera and a control and/or adjustment unit with image processing software, the positions of the proton exchange membranes and/or the first and second subgasket strip and/or the first and/or second subgasket are captured and controlled and/or adjusted as a function thereof, in particular for precise positioning.

The strip-shaped membrane-electrode assembly is expediently stored in a storage device, in particular a storage roller, without removing the parts of the first and second subgasket within the perforations, so that the proton exchange membranes are protected by the first and second subgaskets.

In a further variant, the connection of the proton exchange membranes to the in each case first and second subgaskets with a laminating roller is carried out continuously in the state of the first and second subgasket as first and second subgasket strip.

In a supplementary embodiment, first gas diffusion layers are removed, in particular unwound, from a fourth storage device, in particular a fourth roll, as first gas diffusion layer strip, and second gas diffusion layers are removed, in particular unwound, from a fifth storage device, in particular a fifth roll, as second gas diffusion layer strip, and the first gas diffusion layers separated from the first gas diffusion layer strip are fastened to the first subgaskets as first subgasket strip and the second gas diffusion layers separated from the second gas diffusion strip are fastened to the second subgaskets as second subgasket strip, such that the membrane-electrode assemblies are produced with a respective first and second gas diffusion layer. Thus, in a continuous method, membrane-electrode assemblies can be produced with the first and second gas diffusion layers.

Expediently, before storage, in particular winding, in a storage device, in particular a storage roller, perforations are worked in at the positions of the necessary later separation. After unwinding from the storage roll, the membrane-electrode assemblies can thus be finally produced in a simple manner by separating the perforations.

Preferably, the strip is stored, in particular wound, in a storage device, in particular a storage roll. The strip comprises at least the first and second subgasket strip and the proton exchange membranes arranged between them with anodes and cathodes and preferably catalyst layers.

In a further variant, the sealing layer comprises thermoplastics, in particular polyethylene naphthalate, as a material.

In a further variant, the sealing layers with the first and second subgasket fully circumferentially enclose the proton exchange membrane as the inner region at an outer edge of the proton exchange membrane.

In a further configuration, the method steps, in particular all method steps of the method for producing the membrane-electrode assemblies, are carried out continuously and/or simultaneously.

A fuel cell system according to the present invention, in particular for a motor vehicle, comprising a fuel cell unit as a fuel cell stack with fuel cells, a compressed gas reservoir for the storage of gaseous fuel, a gas conveying device for conveying a gaseous oxidizer to the cathodes of the fuel cells, wherein the fuel cell unit is configured as a fuel cell unit described in this intellectual property application.

Preferably, the membrane-electrode assembly comprises at least one catalyst layer, in particular two catalyst layers.

In a further variant, storage devices for the proton exchange membranes and/or the first subgaskets and/or the second subgaskets are devices for producing the proton exchange membranes and/or the first subgaskets and/or the second subgaskets. The proton exchange membranes and/or the first subgaskets and/or the second subgaskets can thus be provided in that they are simultaneously produced as devices for production along with the production of the membrane-electrode assemblies in the storage devices.

In a further configuration, the at least one catalyst layer is a separate layer on the anode and/or cathode, or the at least one catalyst layer is integrated into the anode and/or cathode, in particular in that the anode and/or cathode comprises a catalyst material.

In a supplementary configuration, the fuel cell unit comprises at least one supply channel for supplying fuel into the fuel cells, and in particular the at least one supply channel is partially formed from fluid openings in the fluid opening regions of the first and second subgasket of the membrane-electrode assemblies.

In a supplementary variant, the components of the fuel cells and/or the fuel cells of the fuel cell unit are arranged so as to be stacked in alignment, in particular one above the other.

In a further configuration, the fuel cell unit comprises a housing and preferably a storage plate. The housing and preferably the storage plate preferably bound an inner space. In particular, the fuel cell stack is arranged within the inner space.

In a further variant, the fuel cell unit comprises at least one connection device, in particular multiple connection devices, and tensioning elements.

Expedient components for fuel cells are membrane-electrode assemblies, proton exchange membranes, anodes, cathodes, gas diffusion layers, and bipolar plates.

In a further embodiment, the connection device is configured as a bolt and/or is rod-shaped and/or is configured as a tensioning belt.

The tensioning elements are expediently configured as clamping plates.

In a further variant, the gas conveying device is configured as a blower and/or a compressor and/or pressurized vessel with oxidizer.

In particular, the fuel cell unit comprises at least 3, 4, 5 or 6 connection devices.

In a further configuration, the tensioning elements are plate-shaped and/or disc-shaped and/or planar and/or formed as a grid.

Preferably, the fuel is hydrogen, hydrogen-rich gas, reformate gas, or natural gas.

Expediently, the fuel cells are substantially planar and/or disc-shaped.

In a supplementary variant, the oxidizer is air with oxygen or pure oxygen.

Preferably, the fuel cell unit is a PEM fuel cell unit with PEM fuel cells.

BRIEF DESCRIPTION OF THE DRAWINGS

Embodiment examples of the invention are explained in greater detail below with reference to the accompanying drawings. The following are shown.

DETAILED DESCRIPTION

Figure 1:
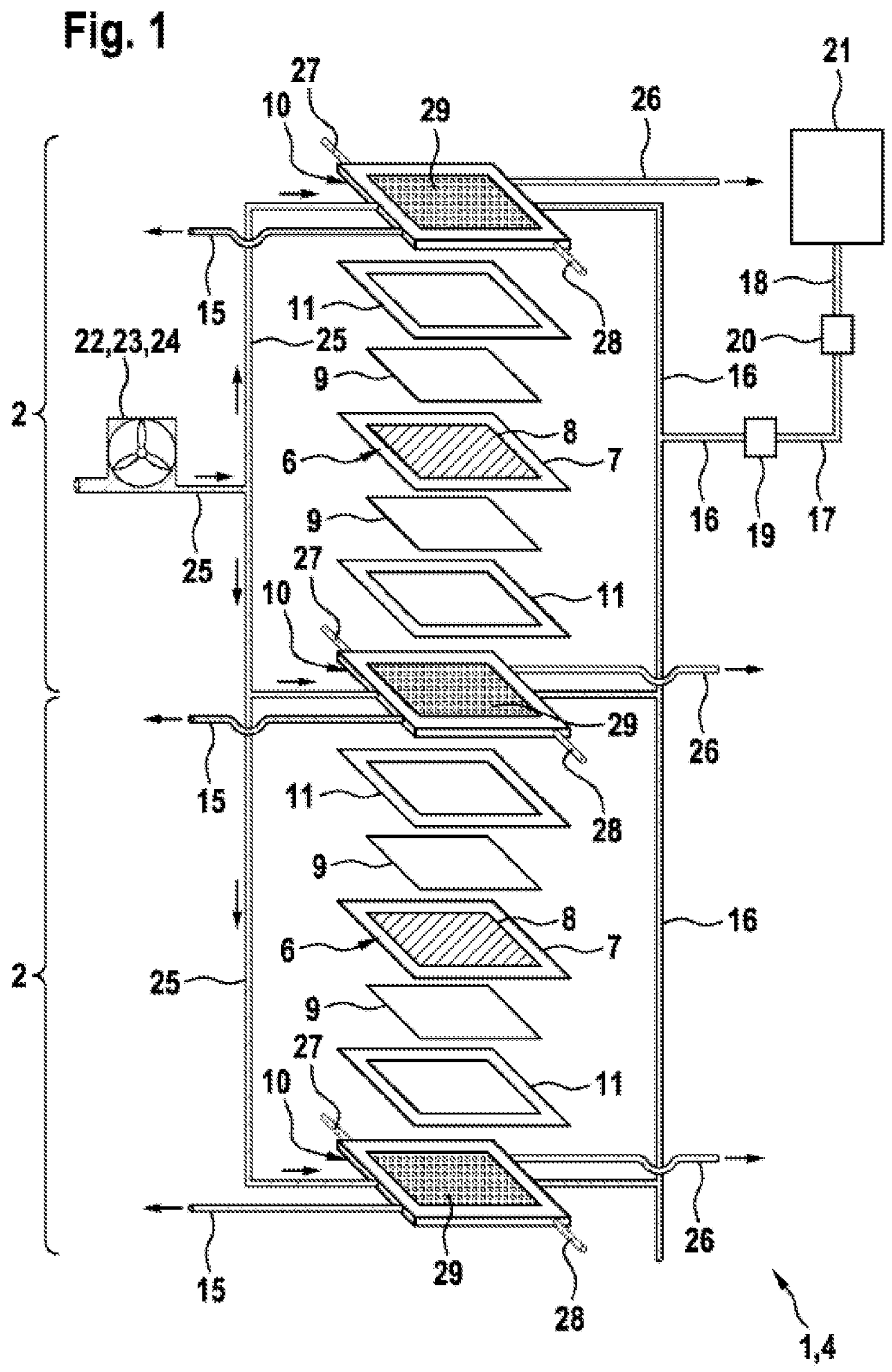
FIG. 1 a highly simplified exploded view of a fuel cell system with components of a fuel cell, FIG. 2 a perspective view of a portion of a fuel cell, FIG. 3 a longitudinal section through a fuel cell, FIG. 4 a perspective view of a fuel cell unit as a fuel cell stack, i.e. a fuel cell stack, FIG. 5 a section through the fuel cell unit according to FIG. 4, FIG. 6 a perspective view of a membrane-electrode assembly of the fuel cell unit, FIG. 7 a longitudinal section A-A according to FIG. 6 of the membrane-electrode assembly, FIG. 8 a highly schematic view of a machine system in a first embodiment example for carrying out the method for producing the membrane-electrode assembly, FIG. 9 a highly schematic view of a machine system in a second embodiment example for carrying out the method for producing the membrane-electrode assembly, FIG. 10 a highly schematic view of a machine system in a third embodiment example for carrying out the method for producing the membrane-electrode assembly, FIG. 11 a highly schematic view of a machine system in a fourth embodiment example for carrying out the method for producing the membrane-electrode assembly, and FIG. 12 a highly schematic view of a machine system in a fifth embodiment example for carrying out the method for producing the membrane-electrode assembly.
Figure 2:
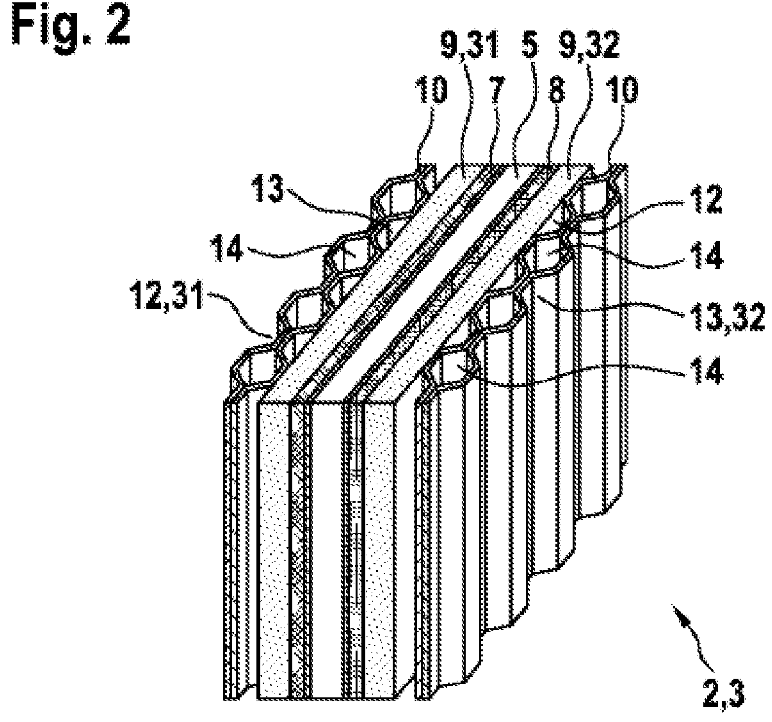
Figure 3:
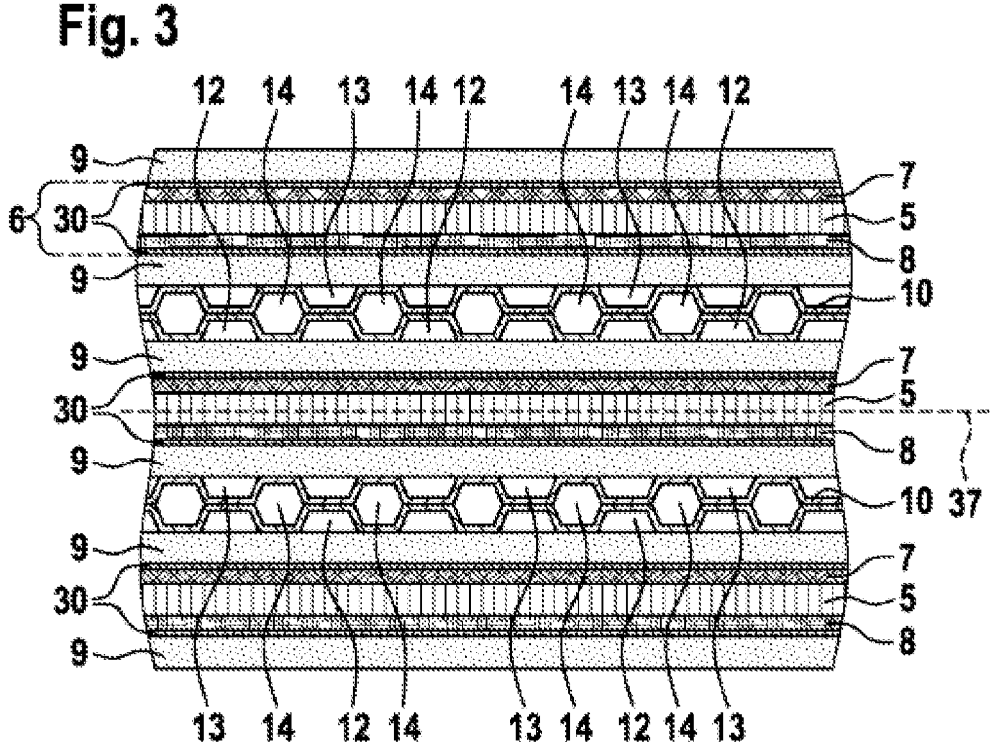

In FIGS. 1 to 3, the basic construction of a fuel cell 2 is shown as a PEM fuel cell 3 (polymer electrolyte fuel cell 3). The principle of fuel cells 2 is that electrical energy or electrical current is generated by means of an electrochemical reaction. Hydrogen $H_2$ is conducted to an anode 7 as a gaseous fuel, and the anode 7 forms the negative pole. A gaseous oxidant, namely air with oxygen, is conducted to a cathode 8, i.e. the oxygen in the air provides the necessary gaseous oxidant. A reduction (electron uptake) takes place on the cathode 8. The oxidation as electron output is carried out at the anode 7.

The redox equations of the electrochemical processes are as follows:

$$O_2+4H^++4e^- \dashrightarrow 2H_2O \qquad \text{Cathode:}$$

$$2H_2 \dashrightarrow 4H^++4e^- \qquad \text{Anode:}$$

Summed reaction equation of cathode and anode:

$$2H_2+O_2 \dashrightarrow 2H_2O$$

The difference in the normal potentials of the electrode pairs under standard conditions as reversible fuel cell voltage or neutral voltage of the unloaded fuel cell 2 is 1.23 V. This theoretical voltage of 1.23 V is not achieved in practice. At rest and at small currents, voltages above 1.0 V can be achieved and, in operation with larger currents, voltages between 0.5 V and 1.0 V are achieved. The series circuit of multiple fuel cells 2, in particular a fuel cell unit 1 as a fuel cell stack 1 of multiple fuel cells 2 arranged one above the other, has a higher voltage, which corresponds to the number of fuel cells 2 multiplied by the single voltage of a respective fuel cell 2.

The fuel cell 2 also comprises a proton exchange membrane 5 (PEM), which is arranged between the anode 7 and the cathode 8. The anode 7 and cathode 8 are configured in a layer or disc shape. The PEM 5 functions as an electrolyte, catalyst carrier, and separating device for the reaction gases. The PEM 5 also functions as an electrical insulator and prevents an electrical short circuit between the anode 7 and cathode 8. In general, 12 μm to 150 μm thick, proton-conductive films made of perfluorinated and sulfonated polymers are used. The PEM 5 conducts the protons $H^+$ and substantially blocks ions other than protons $H^+$ so that charge transport can occur due to the permeability of PEM 5 for the protons $H^+$. The PEM 5 is substantially impermeable to the reaction gases oxygen $O_2$ and hydrogen $H_2$, i.e. it blocks the flow of oxygen $O_2$ and hydrogen $H_2$ between a gas space 31 at the anode 7 with fuel hydrogen $H_2$ and the gas space 32 at the cathode 8 with air and Oxygen $O_2$ as oxidizers. The proton conductivity of the PEM 5 increases with increasing temperature and increasing water content.

On the two sides of the PEM 5, each facing the gas spaces 31, 32, the electrodes 7, 8 are located as the anode 7 and cathode 8. A unit consisting of the PEM 5 and anode 7 as well as cathode 8 is referred to as a membrane-electrode assembly 6 (MEA). The electrodes 7, 8 are pressed together with the PEM 5. The electrodes 6, 7 are platinum-containing carbon particles bonded to PTFE (polytetrafluorethylene), FEP (fluorinated ethylene-propylene copolymer), PFA (perfluoroalkoxy), PVDF (polyvinylidene fluoride), and/or PVA (polyvinyl alcohol) and hot-pressed in microporous carbon fiber, glass fiber, or plastic mats. A catalyst layer 30 is typically applied to the electrodes 7, 8 on the side towards the gas spaces 31, 32. The catalyst layer 30 no the gas space 31 with fuel at the anode 7 comprises nanodispersed platinum ruthenium on graphitized soot particles bonded to a binder. The catalyst layer 30 on the gas space 32 with oxidizer on the cathode 8 analogously comprises nanodispersed platinum. For example, binders include Nafion®, a PTFE emulsion, or polyvinyl alcohol.

A gas diffusion layer 9 (GDL) is located on the anode 7 and cathode 8. The gas diffusion layer 9 at the anode 7 evenly distributes the fuel from channels 12 for fuel to the catalyst layer 30 at the anode 7. The gas diffusion layer 9 on the cathode 8 evenly distributes the oxidizer from channels 13 for oxidizer onto the catalyst layer 30 at the cathode 8. The GDL 9 also draws reaction water counter to the direction of flow of the reaction gases, i.e. in a direction from the catalyst layer 30 to the channels 12, 13. Furthermore, the GDL 9 keeps the PEM 5 moist and conducts the power. For example, the GDL 9 is constructed from a hydrophobized carbon paper and a bonded layer of carbon powder.

A bipolar plate 10 lies atop the GDL 9. The electrically conductive bipolar plate 10 serves as a current collector, for diverting water, for conducting the reaction gases through a channel structure 29 and/or a flow field 29, and for dissipating the waste heat, which occurs in particular in the exothermic electrochemical reaction on the cathode 8. To dissipate the waste heat, channels 14 for passing a liquid or gaseous coolant are worked into the bipolar plate 10. The channel structure 29 on the gas space 31 for fuel is formed by channels 12. The channel structure 29 on the gas space 32 for oxidizers is formed by channels 13. For example, metal, conductive plastics, and composites or graphite are used as the material for the bipolar plates 10. The bipolar plate 10 thus comprises the three channel structures 29 formed by the channels 12, 13, and 14 for separately passing fuel, oxidizer, and coolant.

Figure 4:
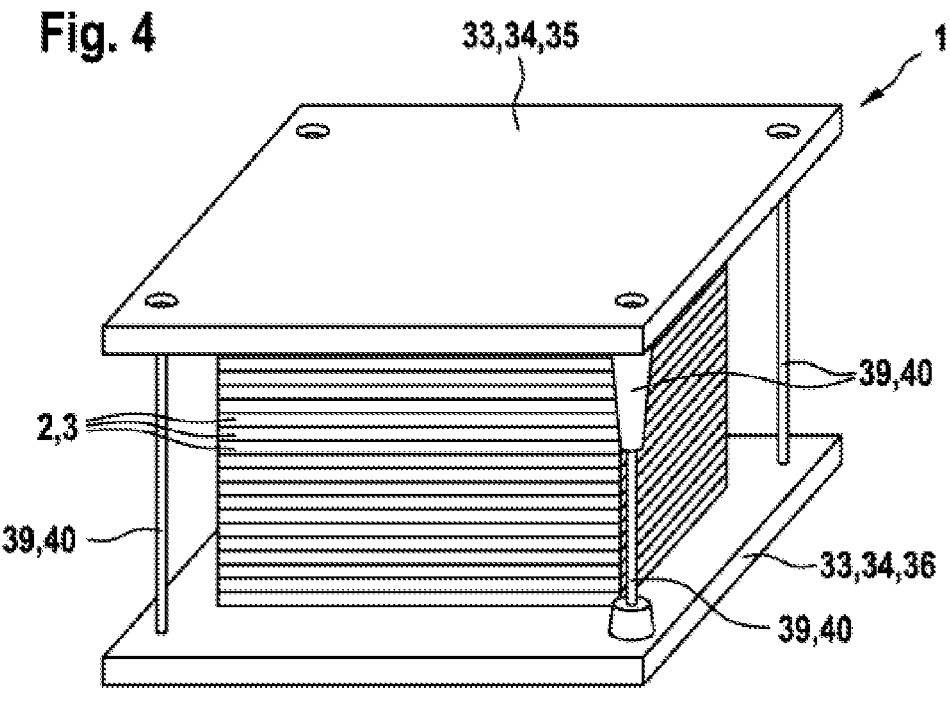
Figure 5:
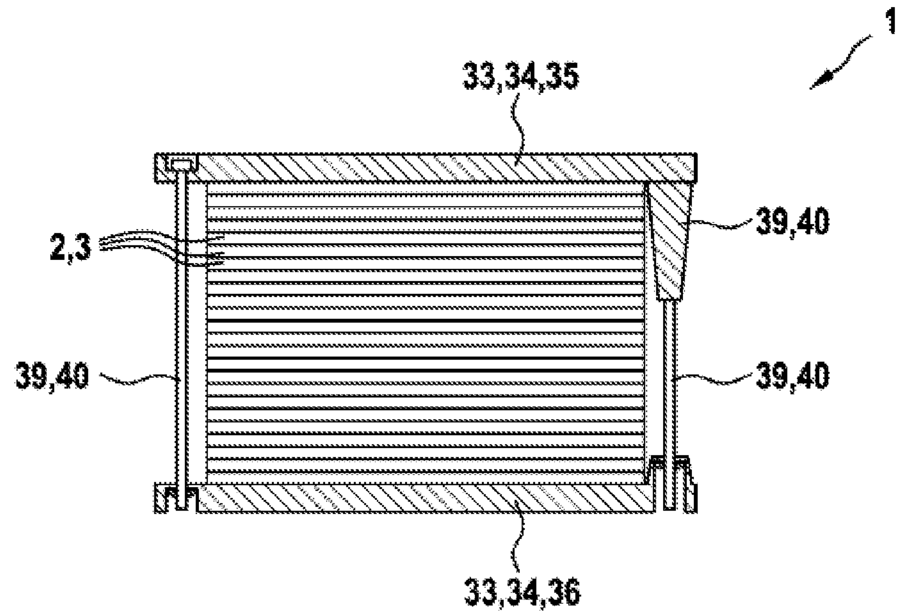

In a fuel cell unit 1 and/or a fuel cell stack 1 and/or a fuel cell stack 1, multiple fuel cells 2 are arranged so to as to be stacked in alignment (FIGS. 4 and 5). An exploded view of two stacked fuel cells 2 is depicted in FIG. 1. A seal 11 seals the gas spaces 31, 32 in a fluid-tight manner. In a compressed gas reservoir 21 (FIG. 1), hydrogen $H_2$ is stored as a fuel at a pressure of, for example, 350 bar to 700 bar. From the compressed gas reservoir 21, the fuel is conducted through a high pressure conduit 18 to a pressure reducer 20 in order to reduce the pressure of the fuel in a medium pressure conduit 17 of about 10 bar to 20 bar. From the medium pressure conduit 17, the fuel is conducted towards an injector 19. At the injector 19, the pressure of the fuel is reduced to an injection pressure of between 1 bar and 3 bar. From the injector 19, the fuel is supplied to a fuel supply line 16 (FIG. 1) and from the supply line 16 to the fuel channels 12 forming the channel structure 29 for fuel. The fuel thus passes through the gas space 31 for the fuel. The gas space 31 for the fuel is formed by the channels 12 and the GDL 9 at the anode 7. After passing through the channels 12, the fuel not consumed in the redox reaction at the anode 7 and, if needed, water are discharged from a controlled humidification of the anode 7 by a discharge line 15 from the fuel cells 2.

Figure 6:
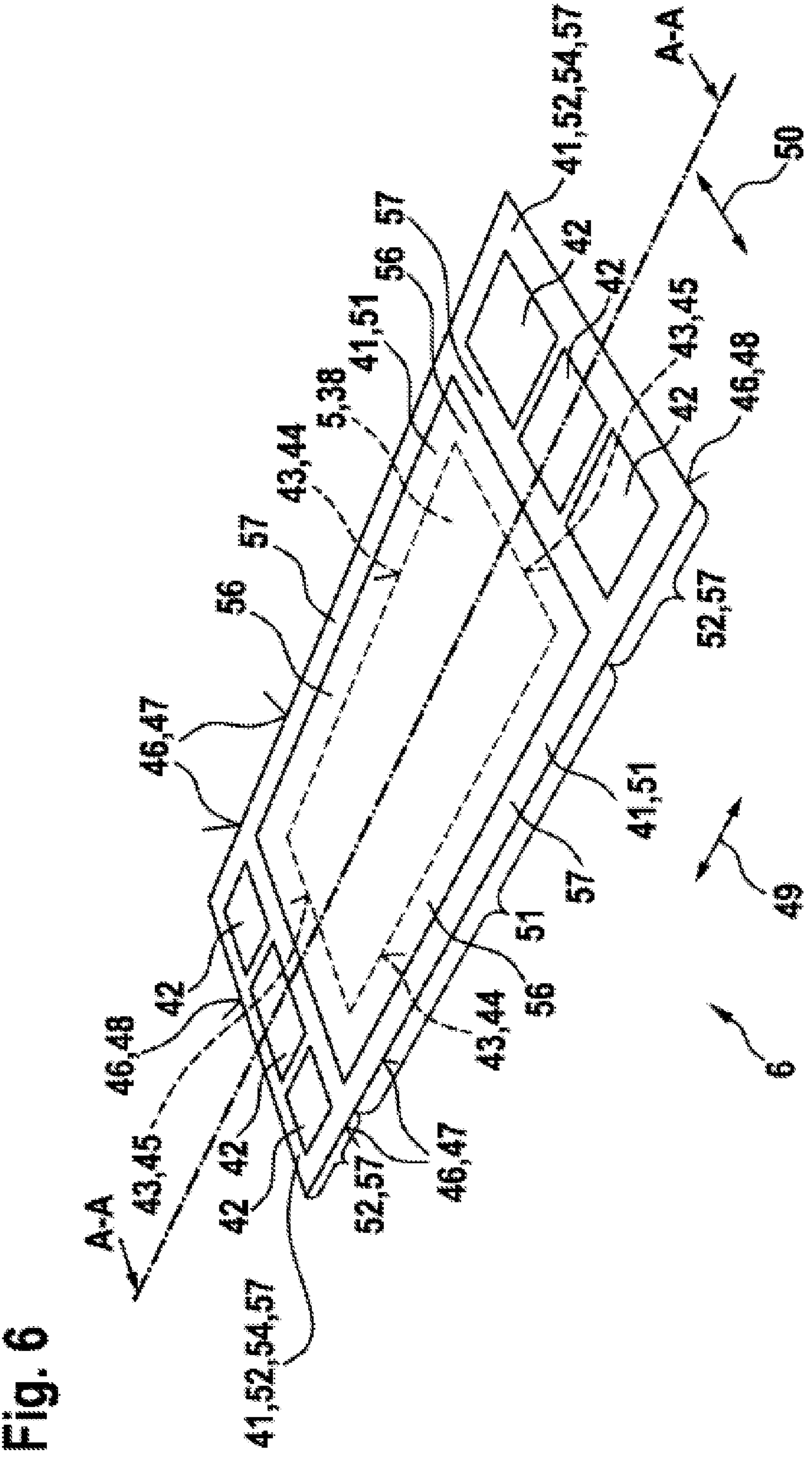
Figure 7:
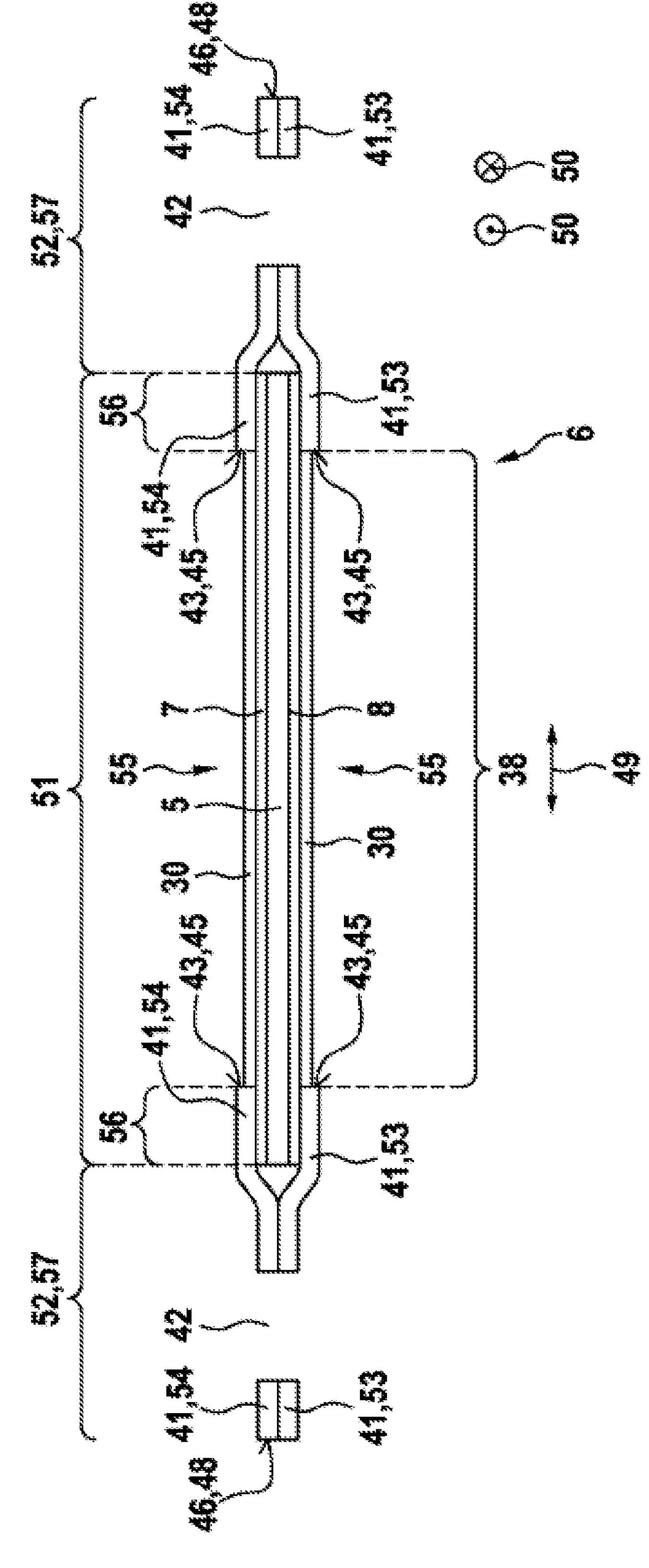

A gas conveying device 22, for example, formed as a blower 23 or a compressor 24, conveys air from the environment as an oxidizer into an oxidizer supply line 25. From the supply line 25, the air is supplied to the oxidizer channels 13, which form a channel structure 29 on the bipolar plates 10 for oxidizers, such that the oxidizer passes through the gas space 32 for the oxidizer. The gas space 32 for the oxidizer is formed by the channels 13 and the GDL 9 on the cathode 8. After passing through the channels 13 or the gas space 32 for the oxidizer 32, the oxidizer not consumed on the cathode 8 and the reaction water resulting on the cathode 8 due to the electrochemical redox reaction are discharged from the fuel cells 2 through a discharge line 26. A supply line 27 is used in order to supply coolant into the channels 14 for coolant, and a discharge line 28 is used in order to discharge coolant conducted through channels 14. The supply and discharge lines 15, 16, 25, 26, 27, 28 are shown in FIG. 1 as separate lines for the sake of simplicity and are in fact constructively formed at the end region near the channels 12, 13, 14 as aligned fluid openings 42 on sealing layers 41 at the end region of the membrane-electrode assemblies 6 arranged one on top of the other (FIGS. 6 and 7). Analogously, fluid openings (not shown) are also formed on plate-shaped extensions (not shown) of the bipolar plates 10, and the fluid openings in the plate-shaped extensions of the bipolar plates 10 align with the fluid openings 42 and the sealing layers 41 of the membrane-electrode assemblies 6 for partially forming the supply and discharge lines 15, 16, 25, 26, 27, 28. The fuel cell stack 1 together with the compressed gas reservoir 21 and the gas conveying device 22 form a fuel cell system 4.

In the fuel cell unit 1, the fuel cells 2 are arranged between two clamping elements 33 as clamping plates 34. An upper clamping plate 35 lies atop the uppermost fuel cell 2 and a lower clamping plate 36 lies atop the lowermost fuel cell 2. The fuel cell unit 1 comprises about 200 to 400 fuel cells 2, all of which are not shown in FIG. 4 for illustrative reasons. The clamping elements 33 impart a compression force on the fuel cells 2, i.e. the upper clamping plate 35 imparts a compression force on the uppermost fuel cell 2 and the lower clamping plate 36 imparts a compression force on the lowermost fuel cell 2. The fuel cell stack 2 is thus tensioned in order to ensure the sealing for the fuel, the oxidizer, and the coolant, in particular due to the elastic seal 11, and also to keep the electrical contact resistance within the fuel cell stack 1 as low as possible. To clamp the fuel cells 2 with the clamping elements 33, four connection devices 39 are configured on the fuel cell unit 1 as bolts 40, which are tensioned. The four bolts 40 are fixedly connected to the clamping plates 34.

Figure 12:
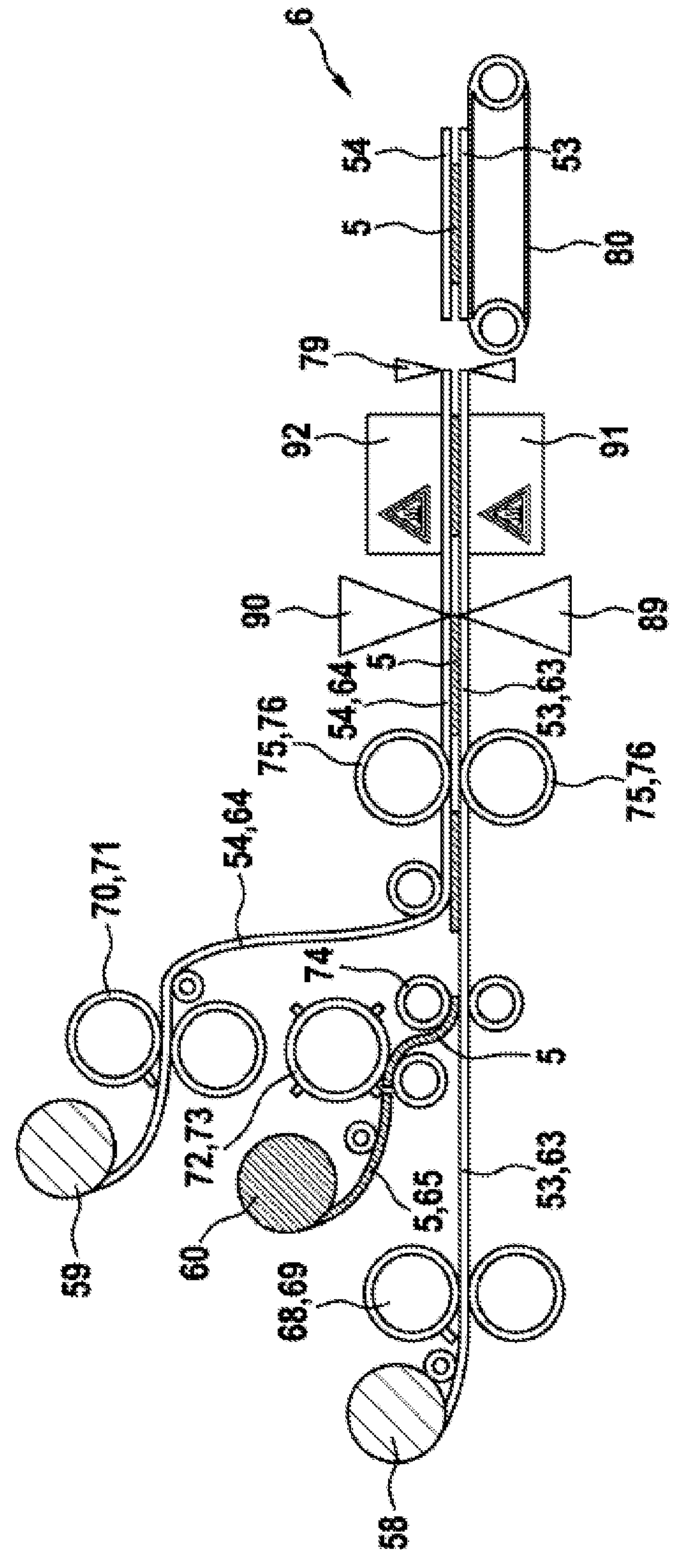

FIG. 6 shows a perspective view of the membrane-electrode assembly 6 of the fuel cell unit 1 produced with the machine system shown in FIG. 12. The layered membrane-electrode assembly 6 comprises a layered inner region 38 from the proton exchange membrane 5. The substantially rectangular proton exchange membrane 5 is completely enclosed and framed by two layered sealing layers 41 as a first subgasket 53 and a second subgasket 54. In the inner region 38, between the layered anode 7 and the layered cathode 8, there is arranged the layered proton exchange membrane 5. The sealing layers 41 and thus the first and second subgaskets 53, 54 comprise the material polyethylene naphthalate (PEN) as a thermoplastic. The layered membrane-electrode assembly 6 spans an imaginary plane 37 (FIG. 3). Moreover, the bipolar plates 10 and gas diffusion layers 9 also span imaginary planes 37 which are parallel to one another.

The proton exchange membrane 5 is arranged at an edge region between the first and second subgaskets 53, 54 as an overlap region 56. At this overlap region 56, the edge region of the proton exchange membrane 5 is materially bonded, in particular with an adhesive, to the inner sides of the first and second subgaskets 53, 54. Deviating from this, the proton exchange membrane 5 can also be connected only to the first subgasket 53 or only to the second subgasket 54 in a material-locking manner. At a sub-region 57, no proton exchange membrane 5 is arranged between the first and second subgaskets 53, 54, i.e. the first and second subgaskets 53, 54 are directly connected to one another at the sub-region 57. The first and second subgaskets 53, 54 terminate at a respective opening 55 on a circumferential rim 43. The rim 43 is produced in that a perforation is first worked into the proton exchange membrane 5 and then, after arranging the proton exchange membrane 5 between the first and second subgaskets 53, 54, the perforation is fully separated and a portion of the first and second subgaskets 53, 54 is removed within a respective perforation. The rim 43 comprises two long sides 44 parallel to a longitudinal direction 49 and two broad sides 45 parallel to a transverse direction 50. The first and second subgaskets 53, 54 have a circumferential outer rim 46 with two long sides 47 and two broad sides 48. At a fluid opening region 52 of the first and second subgaskets 53, 54 as the sub-region 57, six fluid openings 42 are configured as supply and discharge lines 15, 16, 25, 26, 27, 28 for the introduction and removal of fuel, oxidizer, and coolant or cooling fluid into the channels 12, 13, 14. Between the two fluid opening regions 52, a strip region 51 of the membrane-electrode assembly 6 is formed with two stripe-shaped, stacked regions of the first and second subgaskets 53, 54 and with the proton exchange membrane 5.

Figure 8:
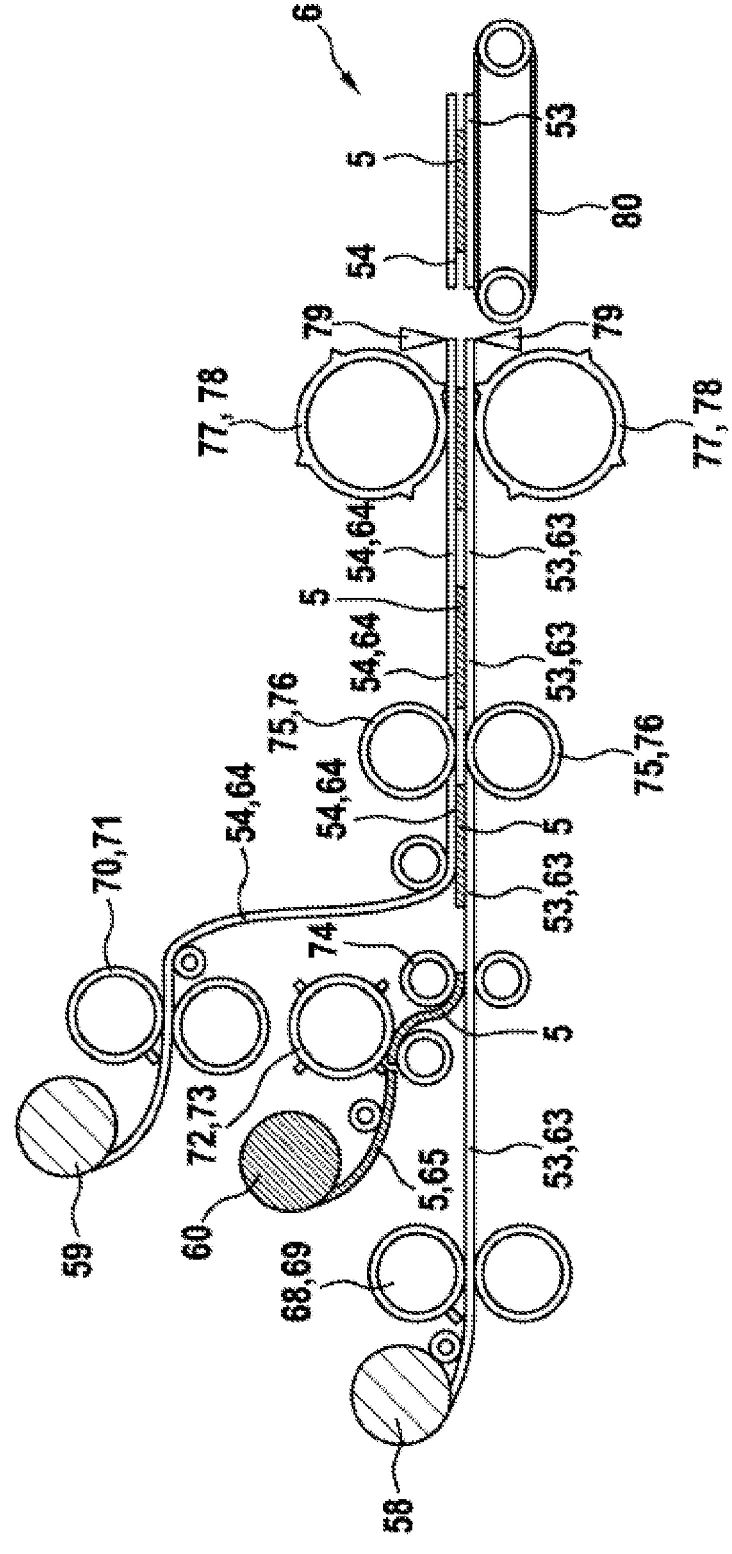

In FIG. 8, a machine system for carrying out a method for producing the membrane-electrode assembly 6 is shown in a first embodiment example. The machine system comprises a first roll 58 as a first storage device 58, and, on the first roll 58, a first subgasket strip 63 is rolled up such that, on the first subgasket strip 63, a large number, for example, more than 50, 100, or 300, of first substantially rectangular subgaskets 53 are connected to one another as first subgasket strip 63. Analogously, on the second roll 59 as second storage device 59, a second subgasket strip 64 is rolled up such that, on the second subgasket strip 64, a large number, for example, more than 50, 100, or 300, of second substantially rectangular subgaskets 54 are connected to one another as second subgasket strip 64. In addition, a proton exchange strip 65 is rolled up on a third roll 60 as the third storage device 60, such that, on the proton exchange strip 65, a large number, for example more than 50, 100, or 300, of substantially rectangular proton exchange membranes 5 are connected to one another as proton exchange strip 65. In addition to the actual proton exchange membrane 5, the proton exchange strip 65 comprises as further layers the anodes 7, the cathodes 8, and, on the anode 7 and the cathode 8, the respective catalyst layer 30. The anodes 7, cathodes 8, and catalyst layers 30 are not shown in FIGS. 1 to 11.

The first and second subgasket strip 63, 64 and the proton exchange membrane strip 65 are simultaneously unwound from the rolls 58, 59, 60. After unrolling or unwinding, the first subgasket strip 63 is guided through a first embossing roller 69 as first separating device 68 and, under the first driven embossing roller 69, there is arranged a further driven roller so that the first subgasket strip 63 is carried out between the first embossing roller 69 and the further roller such that it additionally functions as a conveyor device for unwinding the first subgasket strip 63 from the first roll 58. The first embossing roller 69 intersects six fluid openings 42 into each first subgasket 53 at the two fluid opening regions 52 and also a perforation for the large opening 55 for the proton exchange membrane 5 such that the proton exchange membrane 5 is accessible through the opening 55 as a window 55 for the process fluids for the electrochemical reaction after the later full separation of the perforation. After unrolling or unwinding, the second subgasket strip 64 is guided through a second embossing roller 71 as second separating device 70 and, under the second driven embossing roller 70, there is arranged a further driven roller so that the second subgasket strip 64 is carried out between the second embossing roller 70 and the further roller such that it additionally functions as a conveyor device for unwinding the second subgasket strip 64 from the second roll 59. The second embossing roller 71 intersects six fluid openings 42 into each first subgasket 54 at the two fluid opening regions 52 and also a perforation for the large opening 55 for the proton exchange membrane 5 such that the proton exchange membrane 5 is accessible through the opening 55 as a window 55 for the process fluids for the electrochemical reaction after the later full separation of the perforation. The proton exchange membrane strip 65 is arranged by a third separating device 72 as a cutting roller 73 and, under the cutting roller 73, a further driven roller is arranged such that the proton exchange membrane strip 65 is carried out between the cutting roller 72 and the further roller such that it additionally functions as a conveyor device for unwinding the proton exchange strip 65 from the third roll 60. The cutting roller 72 cuts individual, substantially rectangular sections from the proton exchange strip 65, and these separated sections form the individual proton exchange membranes 5.

In the device 74, for example a laminating roller, for connecting the separated proton exchange membranes 5 to the first subgasket strip 63, the proton exchange membranes 5 are connected to the first subgasket strip 63 at a distance from one another, and the distance corresponds to twice the length of a respective fluid opening region 52 in the long direction 49. The connection is carried out in a material-locking and/or positive-locking manner, for example by gluing, embossing, and/or hot laminating. Subsequently, the first subgasket strip 63 and the individual proton exchange membranes 5 already separated are coated with the second subgasket strip 64, such that the fluid openings 42 in the fluid opening regions 52 and the openings 55 in the first and second subgasket strips 63, 64 are aligned, and thus the proton exchange membranes 5 are arranged at the overlap regions 56 between the first and second subgaskets 63, 64. In the device 75, as two laminating rollers 76 for connecting the first and second subgasket strips 63, 64 to one another and to the proton exchange membranes 5, the first and second subgasket strips 63, 64 and the proton exchange membranes 5 are connected to one another by laminating and/or embossing, i.e. in a material-locking and/or positive-locking manner. In the device 77 removal and/or lifting, at the first and second subgasket strips 63, 64, the regions of the first and second subgasket strips 63, 64 enclosed by the perforation are removed, i.e. the perforations worked in with the first and second separating device 68, 70 are completely separated, in particular torn when removed so that the proton exchange membranes 5 are accessible at the openings 55. The device 77 is configured as, for example, a tearing roller 78 or a vacuum suction cup or a vacuum roller 78. Subsequently, the strip with the interconnected first and second subgasket strips 63, 64 and the interposed connected proton exchange membranes 5 at the respective ends in the longitudinal direction 49 of the fluid opening regions 52, i.e. at sub-regions of the first and second subgasket strip without proton exchange membrane 5, is separated by the fourth separating device 79, such that the individual membrane-electrode assemblies 6 are formed. The membrane-electrode assemblies 6 are transported away by a conveyor belt 80. The above operations are carried out continuously and simultaneously and are preferably monitored, controlled, and/or adjusted with cameras and image processing software in a control and/or adjustment unit (not shown), in particular regarding the positions of the proton exchange membranes 5 and the first and second subgaskets 53, 54, as first and second subgasket strips 63, 64 in relation to one another.

Figure 9:
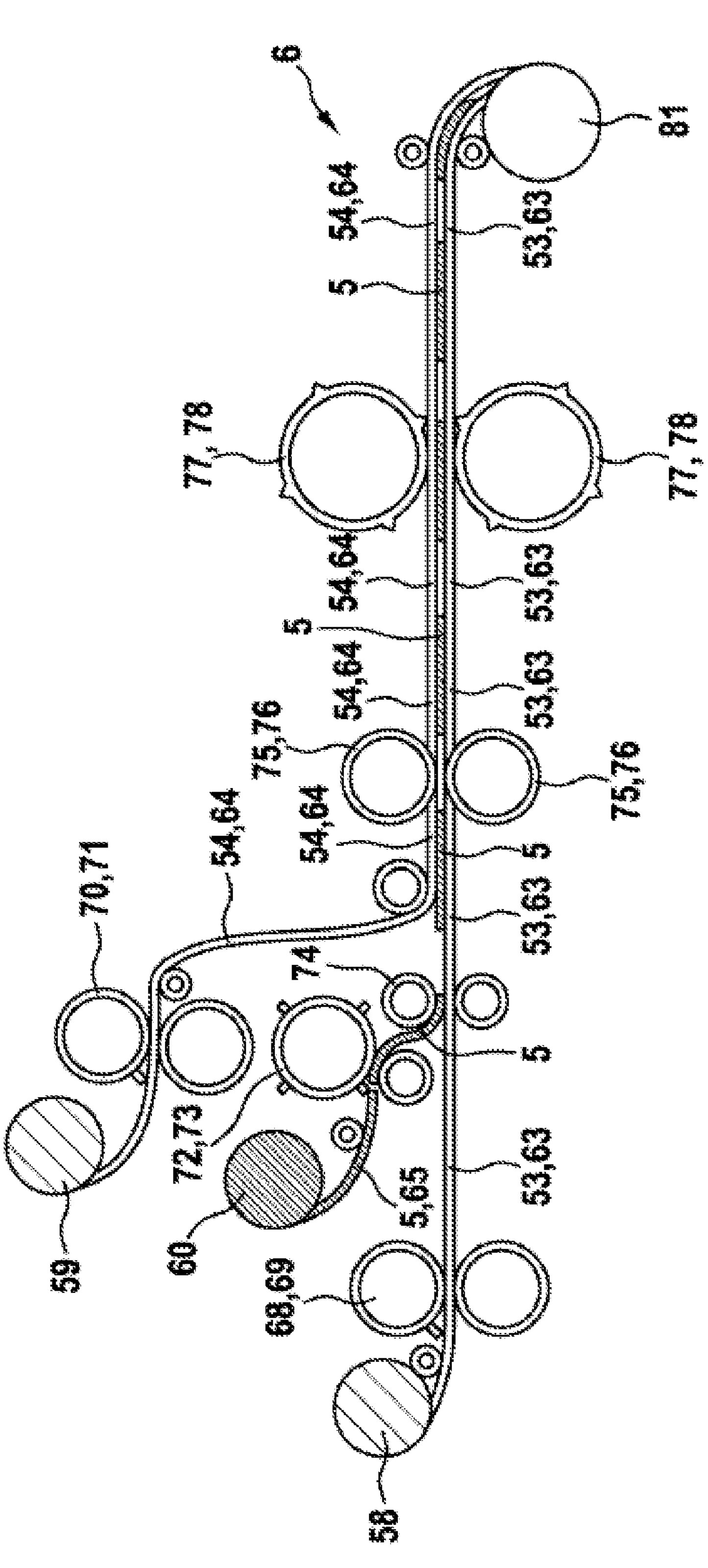

In FIG. 9, a machine system for carrying out a method for producing the membrane-electrode assembly 6 is shown in a second embodiment example. In the following, substantially only the differences compared to the first embodiment example according to FIG. 8 are described. The strip with the first and second subgasket strip 63, 64 and the proton exchange membranes 5 arranged at intervals between them are not separated by a separating device 79 but rather rolled up on a storage roll 81 as the storage device 81 and can thus be easily transported. For the final production of the membrane-electrode assemblies 6, the strip rolled up on the storage roll 81 is unwound and separated with a separating device (not shown), analogously to the first embodiment example. The exact position of the cut can be determined with a camera and image processing software as well as a control and/or adjustment unit, for example using the openings 55, because the openings 55 can be captured by the camera.

Figure 10:
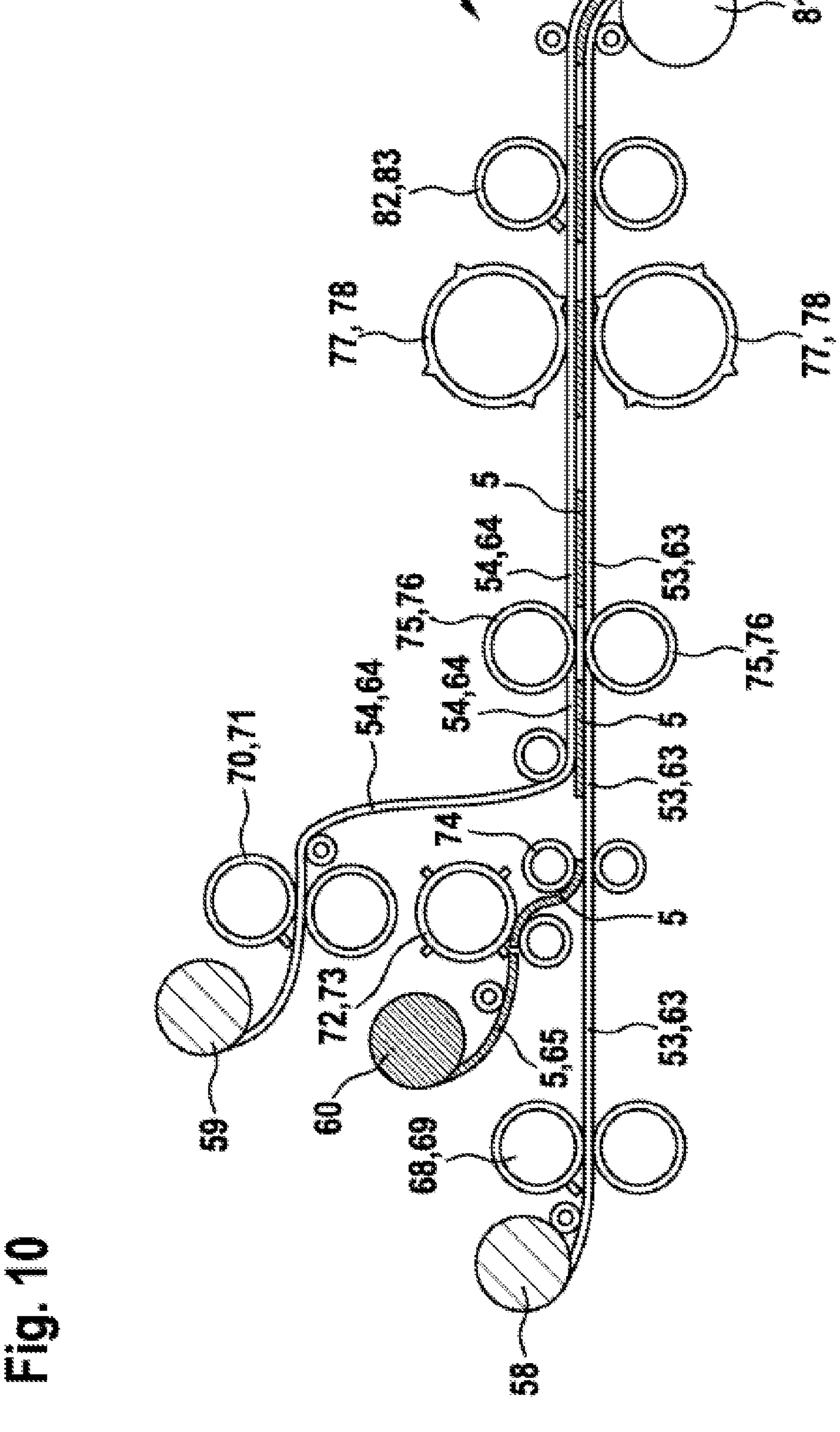

In FIG. 10, a machine system for carrying out a method for producing the membrane-electrode assembly 6 is shown in a third embodiment example. In the following, substantially only the differences compared to the first embodiment example according to FIG. 8 are described. The strip with the first and second subgasket strips 63, 64 and the proton exchange membranes 5 arranged at intervals between them are not separated by a separating device 79, but rather a fifth separating device 82 as an embossing roller 83 is worked into a perforation at the positions of the later necessary separation and then rolled up on the storage roll 81 for easy transport. Due to the worked in perforations, the positions of the necessary full separation of the strip for the final production of the membrane-electrode assemblies 6 can be simply determined and easily carried out after the strip has been unwound from the storage roller 81, for example by capturing the perforations with a camera and image processing software as well as a control and/or adjustment unit.

Figure 11:
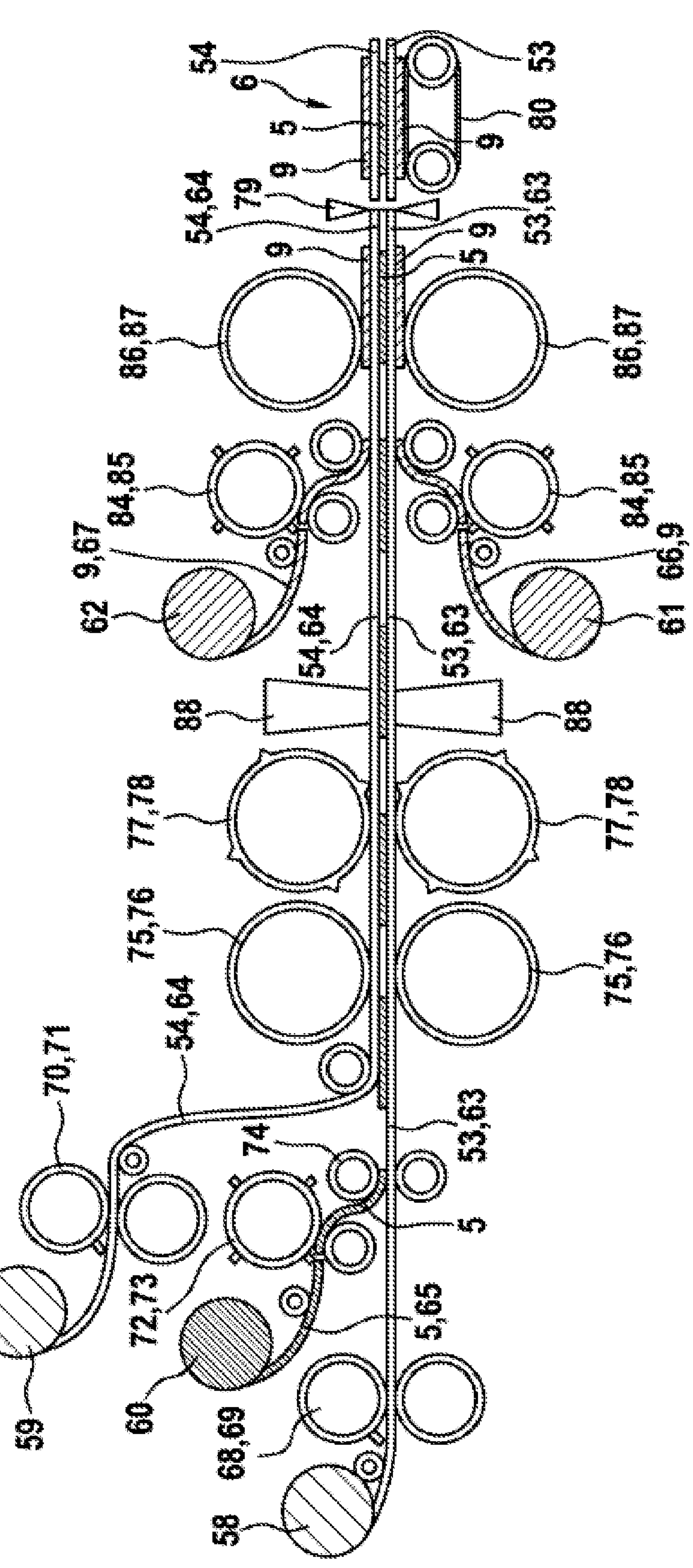

In FIG. 11, a machine system for carrying out a method for producing the membrane-electrode assembly 6 is shown in a fourth embodiment example. In the following, substantially only the differences compared to the first embodiment example according to FIG. 8 are described. After the treatment of the strip in the device 77 and before the separation in the fourth separating device 79, a first gas diffusion layer strip 66 is applied to the outside of the first subgasket strip 63 and connected to an adhesive connection with a device 88 in a materially-locked manner by applying adhesive to the first and second subgasket strips 63, 64 in the method sequence after the treatment in the device 77. Deviating from the above, the adhesive can also be applied to the first and second gas diffusion layer strips 66, 67 with the device 88, or the adhesive is present on a fourth and fifth roll 61, 62 already on the first and second gas diffusion layer strips 66, 67 (not shown). The first gas diffusion layer strip 66 is unwound from the fourth roll 61 as the fourth storage device 61 and is separated before being applied and connected to the first subgasket strip 63 into a sixth separating device 84 as the cutting roller 85, such that, on the first subgasket strip 63, individual substantially rectangular gas diffusion layers 9 are applied on the first subgasket strip 63 at a distance from one another on the strip region 51 of the first subgasket 53 and the proton exchange membrane 5, but not at the fluid opening regions 52. Analogously, a fifth roll 62 is unwound from a fifth storage device 62 with a second gas diffusion layer strip 67, and in the sixth separating device 84, the gas diffusion layers 9 are separated and applied on the second subgasket strip 64. Subsequently, with the device 86 for pressing as two pressing rollers 87, the strip is pressed together with the proton exchange membranes 5, the first and second subgasket strips 63, 64, and the first and second separated gas diffusion layers 9 such that the first and second gas diffusion layers 9 are materially adhered to the first and second gasket strips 66, 67 by means of the adhesive. Alternatively, a connection without adhesive with lamination or a high ionomer content in the first and second gas diffusion layer strips 66, 67 can be achieved (not shown). Subsequently, the strip is separated by the fourth separating device 79 from the membrane-electrode assemblies 6 with first and second gas diffusion layers 9 and transported away by the conveyor belt 80.

In FIG. 12 a machine system for carrying out a method for producing the membrane-electrode assembly 6 is shown in a fourth embodiment example. In the following, substantially only the differences compared to the first embodiment example according to FIG. 8 are described. No catalyst layer 30 is present on the proton exchange membrane strip 65 on the third roll 60. The catalyst layer 30 is applied to the proton exchange membrane 5 after treating the strip with the device 75 with a first device 89 in the opening 55 of the first subgasket strip 63, in particular by spraying, and to the proton exchange membrane 5 with a second device 90 in the opening 55 of the second subgasket strip 64, in particular by spraying. Instead of spraying, screen printing or template printing can be used as the coating method, for example. The catalyst layers 30 are thus present exclusively according to FIG. 7 at the proton exchange membrane 5 in the openings 55 and not also between the proton exchange membrane 5 and the first and second subgaskets 53, 54 at the overlap region 56 as in the first embodiment example, so that material costs for the catalyst layer 30 can be saved. After coating with the catalyst layers 30, the catalyst layer 30 on the proton exchange membrane 5 in the opening 55 of the first subgasket strip 63 is dried with a first drying device 91 and, analogously, the catalyst layer 30 on the proton exchange membrane 5 in the opening 55 of the second subgasket strip 64 is dried with a second drying device 92.

Deviating from the above, on the proton exchange membrane strip 65 on the third roll 60, no catalyst layer 30, no anode 7, and no cathode 8 are present, and a first mixed layer consisting of catalyst layer 30 and anode 7 and a second mixed layer consisting of catalyst layer 39 and cathode 8 is applied to the proton exchange membrane 5. After treating the strip with the device 75 with the first device 89, the second mixed layer is applied to the proton exchange membrane 5 in the opening 55 of the first subgasket strip 63, in particular by spraying, and with the second device 90 the first mixed layer is applied to the proton exchange membrane 5 in the opening 55 of the second subgasket strip 64, in particular by spraying. Subsequently, the membrane-electrode assemblies 6 are cut off with the fourth separating device 79 and transported away by the conveyor belt 80. Thus, in this method of production, no anode 7, no cathode 8, and no catalyst layer 30 are present at the overlap region 56, i.e. only the first and second subgaskets 53, 54 and the proton exchange membrane 5 on the membrane-electrode assembly 6.

The individual embodiment examples can be combined with one another.

Overall, significant advantages are associated with the method according to the invention for producing the membrane-electrode assembly 6, the fuel cell unit 1 according to the invention, and the method according to the invention for producing the fuel cell unit 1. The individual layers of the membrane-electrode assembly 6, i.e. the proton exchange membrane 5 with anode 7, cathode 8, and optional catalyst layer 30, as well as the first subgasket 53 and the second subgasket 54 are arranged on top of one another and connected to one another in a continuous process as a common strip, i.e. common multilayer belt, so that the production process can be significantly accelerated, and thus costs are reduced.

The invention claimed is:

1. A method for producing membrane-electrode assemblies (6) for a fuel cell unit (1) as a fuel cell stack (1), comprising the following steps:

providing in each case one proton exchange membrane (5), providing in each case one first subgasket (53) as a sealing layer (41), providing in each case one second subgasket (54) as a sealing layer (41), arranging the in each case one proton exchange membrane (5) between the in each case first and in each case second subgasket (53, 54), connecting the in each case one proton exchange membrane (5) to the in each case first and/or in each case second subgasket (53, 54), such that in each case one layered inner region (38) of the in each case one proton exchange membrane (5) is enclosed by the in each case one first and second subgasket (53, 54) as sealing layers (41), wherein the proton exchange membranes (5), the first subgaskets (53), and the second subgaskets (54) are provided in that they are removed as a proton exchange membrane strip (65), a first subgasket strip (63), and a second subgasket strip (64) from storage devices (58, 59, 60) and the arrangement of the proton exchange membranes (5) between the first and second subgaskets (53, 54) and the connection of the proton exchange membranes (5) to the first and/or second subgaskets (53, 54) are configured in a state of the first subgaskets (53) as first subgasket strip (63) and of the second subgasket (54) as second subgasket strip (64), such that, during the arrangement and connection, the first subgaskets (53) are arranged connected to one another on the first subgasket strip (63) and the second subgaskets (54) are arranged connected to one another on the second subgasket strip (64), wherein the first subgaskets (53) are removed from a first storage device (58) as first subgasket strip (63), the second subgaskets (54) are removed from a second storage device (59) as second subgasket strip (64), and the proton exchange membranes (5) are removed from a third storage device (60) as proton exchange membrane strip (65), wherein after the removal of the first subgaskets (53) from the first storage device (58), one perforation per respective opening (55) for the proton exchange membrane (5) is worked into the first subgaskets (53) as first subgasket strip (63) in a respective strip region (51), and after the removal of the second subgaskets (54) from the second storage device (59), one perforation per respective opening (55) for the proton exchange membrane (5) is worked into the second subgaskets (54) as second subgasket strip (64) in a respective strip region (51), and wherein a plurality of fluid openings (42) for process fluids and the perforations for the openings (55) are continuously worked into the first and second subgaskets (53, 54) as first and second subgasket strips (63, 64) by separating devices (68, 70).

2. The method according to claim 1, wherein the removal of the proton exchange membranes (5), the first subgaskets (53), and the second subgaskets (54) from the storage devices (58, 59, 60), the arrangement of the proton exchange membranes (5) between the first and second subgaskets (53, 54), and the connection of the proton exchange membranes (5) to the second subgaskets (53, 54) is carried out in a continuous process.

3. The method according to claim 1, wherein the removal of the proton exchange membranes (5), the first subgaskets (53), and the second subgaskets (54) from the storage devices (58, 59, 60), the arrangement of the proton exchange membranes (5) between the first and second subgaskets (53, 54), and the connection of the proton exchange membranes (5) to the second subgaskets (53, 54) is carried out simultaneously.

4. The method according to claim 1, wherein the fluid openings (42) are worked into the first and second subgaskets (53, 54) as first and second subgasket strips (63, 64) before or after the arrangement of the proton exchange membranes (5) between the first and second subgaskets (53, 54) is carried out.

5. The method according to claim 1, wherein after incorporation of the fluid openings (42) into the first and second subgaskets (53, 54), the first and second subgaskets (53, 54) are arranged as first and second subgasket strip (63, 64) on top of one another so as to align respective fluid openings (42) of the first and second subgaskets (53, 54).

6. The method according to claim 1, wherein before the arrangement of the proton exchange membranes (5) between the first and second subgaskets (53, 54) as first and second subgasket strip (63, 64), the proton exchange membrane (5) is cut off from the proton exchange membrane strip (65) for a respective membrane-electrode assembly (6), and a respective section (5) is cut off from the proton exchange membrane strip (60) as the respective proton exchange membrane (5) for the respective membrane-electrode assembly (6), and subsequently the arrangement of the respective proton exchange membrane (5) as the respectively cut-off section (5) between the first and second subgasket strip (63, 64) is carried out.

7. The method according to claim 6, wherein at sub-regions of the first and second subgasket strip (63, 64) in a longitudinal direction (49) between the proton exchange membranes (5), no proton exchange membrane (5) is arranged.

8. The method according to claim 6, wherein the separated sections (5) as the proton exchange membranes (5) are fixed on the first or second subgasket strip (63, 64) before being arranged between the first and second subgaskets (53, 54) as first and second subgasket strip (63, 64).

9. The method according to claim 1, wherein after the arrangement of the proton exchange membranes (5) between the first and second subgaskets (53, 54) as first and second subgasket strip (63, 64) and the connection of the proton exchange membranes (5) to the first and/or second subgaskets (53, 54) as first and second subgasket strip (63, 64), the first and second subgasket strip (6) are separated, so that individually separate membrane-electrode assemblies (63, 64) are produced.

10. A method for producing a fuel cell unit (1) as a fuel cell stack (1) for electrochemically generating electrical energy, with the following steps:

providing components (5, 6, 7, 8, 9, 10) of the fuel cells (2), including membrane-electrode assemblies (6), gas diffusion layers (9), and bipolar plates (10), wherein the membrane-electrode assemblies (6) comprise a respective layered inner region (38) with a proton exchange membrane (5), an anode (7), and a cathode (8) and two respective sealing layers (41) as first and second subgaskets (53, 54), and the proton exchange membrane (5) is arranged between the anode (7) and cathode (8), and the sealing layers (41) enclosing the inner region (38) are configured as first and second subgaskets (53, 54)

stacking the components (5, 6, 7, 8, 9, 10) of the fuel cells (2) so that fuel cells (2) and a fuel cell unit (1) are formed, wherein the membrane-electrode assemblies (6) are provided by carrying out a method according to claim 1.

11. The method according to claim 1, wherein the first subgaskets (53) are unwound from a first roll (58) as first subgasket strip (63), the second subgaskets (54) are unwound from a second roll (59) as second subgasket strip (64), and the proton exchange membranes (5) are unwound from a third roll (60) as proton exchange membrane strip (65).

12. The method according to claim 1, wherein six fluid openings (42) are worked into the first subgaskets (53) in a fluid opening region (52), and wherein six fluid openings (42) are worked into the second subgaskets (54) in a fluid opening region (52).

13. The method according to claim 4, wherein the fluid openings (42) are worked into the first and second subgaskets (53, 54) as first and second subgasket strips (63, 64) before the connection of the proton exchange membranes (5) to the first and/or second subgaskets (53, 54) is carried out.

14. The method according to claim 1, wherein the separating devices (68, 70) are embossing rollers (69, 71).

15. The method according to claim 8, wherein the separated sections (5) as the proton exchange membranes (5) are fixed on the first or second subgasket strip (63, 64) with a laminating roller (74).

16. A method for producing membrane-electrode assemblies (6) for a fuel cell unit (1) as a fuel cell stack (1), comprising the following steps:

providing in each case one proton exchange membrane (5), providing in each case one first subgasket (53) as a sealing layer (41), providing in each case one second subgasket (54) as a sealing layer (41), arranging the in each case one proton exchange membrane (5) between the in each case first and in each case second subgasket (53, 54), connecting the in each case one proton exchange membrane (5) to the in each case first and/or in each case second subgasket (53, 54), such that in each case one layered inner region (38) of the in each case one proton exchange membrane (5) is enclosed by the in each case one first and second subgasket (53, 54) as sealing layers (41), wherein the proton exchange membranes (5), the first subgaskets (53), and the second subgaskets (54) are provided in that they are removed as a proton exchange membrane strip (65), a first subgasket strip (63), and a second subgasket strip (64) from storage devices (58, 59, 60) and the arrangement of the proton exchange membranes (5) between the first and second subgaskets (53, 54) and the connection of the proton exchange membranes (5) to the first and/or second subgaskets (53, 54) are configured in a state of the first subgaskets (53) as first subgasket strip (63) and of the second subgasket (54) as second subgasket strip (64), such that, during the arrangement and connection, the first subgaskets (53) are arranged connected to one another on the first subgasket strip (63) and the second subgaskets (54) are arranged connected to one another on the second subgasket strip (64), wherein the first subgaskets (53) are removed from a first storage device (58) as first subgasket strip (63), the second subgaskets (54) are removed from a second storage device (59) as second subgasket strip (64), and the proton exchange membranes (5) are removed from a third storage device (60) as proton exchange membrane strip (65), wherein after the removal of the first subgaskets (53) from the first storage device (58), fluid openings (42) for process fluids are worked into the first subgaskets (53) as first subgasket strip (63), and, after the removal of the second subgasket (54) from the second storage device (59) fluid openings (42) for process fluids are worked into the second subgaskets (54) as second subgasket strip (64), and wherein six fluid openings (42) are worked into the first subgaskets (53) in a fluid opening region (52), and wherein six fluid openings (42) are worked into the second subgaskets (54) in a fluid opening region (52).

17. A method for producing membrane-electrode assemblies (6) for a fuel cell unit (1) as a fuel cell stack (1), comprising the following steps:

providing in each case one proton exchange membrane (5), providing in each case one first subgasket (53) as a sealing layer (41), providing in each case one second subgasket (54) as a sealing layer (41), arranging the in each case one proton exchange membrane (5) between the in each case first and in each case second subgasket (53, 54), connecting the in each case one proton exchange membrane (5) to the in each case first and/or in each case second subgasket (53, 54), such that in each case one layered inner region (38) of the in each case one proton exchange membrane (5) is enclosed by the in each case one first and second subgasket (53, 54) as sealing layers (41), wherein the proton exchange membranes (5), the first subgaskets (53), and the second subgaskets (54) are provided in that they are removed as a proton exchange membrane strip (65), a first subgasket strip (63), and a second subgasket strip (64) from storage devices (58, 59, 60) and the arrangement of the proton exchange membranes (5) between the first and second subgaskets (53, 54) and the connection of the proton exchange membranes (5) to the first and/or second subgaskets (53, 54) are configured in a state of the first subgaskets (53) as first subgasket strip (63) and of the second subgasket (54) as second subgasket strip (64), such that, during the arrangement and connection, the first subgaskets (53) are arranged connected to one another on the first subgasket strip (63) and the second subgaskets (54) are arranged connected to one another on the second subgasket strip (64), wherein the first subgaskets (53) are removed from a first storage device (58) as first subgasket strip (63), the second subgaskets (54) are removed from a second storage device (59) as second subgasket strip (64), and the proton exchange membranes (5) are removed from a third storage device (60) as proton exchange membrane strip (65), wherein the removal of the proton exchange membranes (5), the first subgaskets (53), and the second subgaskets (54) from the storage devices (58, 59, 60) is carried out simultaneously, and after the arrangement of the proton exchange membranes (5) between the first and second subgaskets (53, 54), the connection of the proton exchange membranes (5) to the first and second subgaskets (53, 54) is carried out simultaneously.

* * * * *